(12) United States Patent
Chouinard

(10) Patent No.: US 6,671,701 B1
(45) Date of Patent: Dec. 30, 2003

(54) SYSTEM AND METHOD TO MAINTAIN REAL-TIME SYNCHRONIZATION OF DATA IN DIFFERENT FORMATS

(75) Inventor: Phil Chouinard, West Chester, PA (US)

(73) Assignee: Bentley Systems, Incorporated, Exton, PA (US)

( * ) Notice: Subject to any disclaimer, the term of this patent is extended or adjusted under 35 U.S.C. 154(b) by 247 days.

(21) Appl. No.: 09/586,785

(22) Filed: Jun. 5, 2000

(51) Int. Cl.[7] ............................................. G06F 17/30
(52) U.S. Cl. ....................................................... 707/201
(58) Field of Search ...................... 707/10, 102, 104.1, 707/200, 201, 203, 501.1, 502, 523; 370/219; 703/4; 709/202, 205, 232, 246

(56) References Cited

U.S. PATENT DOCUMENTS

| | | | |
|---|---|---|---|
| 5,815,415 A | | 9/1998 | Bentley et al. |
| 5,987,242 A | | 11/1999 | Bentley et al. |
| 6,167,053 A | * | 12/2000 | Sato ........................... 370/219 |
| 6,202,085 B1 | * | 3/2001 | Benson et al. .............. 709/205 |
| 6,295,541 B1 | * | 9/2001 | Bodnar et al. .............. 707/203 |
| 6,341,291 B1 | * | 1/2002 | Bentley et al. ................ 703/4 |

OTHER PUBLICATIONS

Buzzsaw.com (website).

* cited by examiner

Primary Examiner—Charles Rones
Assistant Examiner—Apu M Mofiz
(74) Attorney, Agent, or Firm—Venable; James R. Burdett

(57) ABSTRACT

Systems and methods of maintaining data in a synchronized state by simplifying and automating the file conversion process in a continuous and mostly background manner are described. The system cycles through iterations and searches a specified source directory (and its subdirectories) for source files. Any source files it encounters for the first time are converted and stored at a specified destination, creating a destination file. A time and date stamp of the destination or converted file is stored in a database. For source files encountered for the second or subsequent time, the date and time stamps of all of these source files are compared against the database that contains file name, date and time information for the converted or destination files. The system automatically converts any source files that are newer than its corresponding destination file.

25 Claims, 3 Drawing Sheets

SYSTEM AND METHOD TO MAINTAIN REAL-TIME SYNCHRONIZATION OF DATA IN DIFFERENT FORMATS

CROSS-REFERENCE TO OTHER APPLICATIONS

This patent application is related to the following patent applications:

(a) U.S. Ser. No. 09/296,738, filed Apr. 22, 1999, for a "System for Collaborative Engineering Using Component and File-Oriented Tools"; (b) U.S. Ser. No. 09/586,786, filed concurrently herewith, for a "System, Method and Computer Program Product for Generating a Viewable Computer Aided Design (CAD) Eplot"; and (c) U.S. Ser. No. 60/114,216, filed concurrently herewith, for a "System and Method of Providing Engineering, Construction, and Operations Computer-Aided Design Services", each of which is commonly assigned to the assignee of the present invention, and is incorporated herein by reference.

FIELD OF THE INVENTION

The present invention is directed generally to systems and methods related to computer-aided design (CAD) software, and more specifically to such systems and methods of providing an automated process for translating design data in different formats.

BACKGROUND OF THE INVENTION

CAD software is well-known, and used by architects, engineers, artists, and the like to create precision drawings and technical illustrations. It is used to create two-dimensional (2-D) drawings and three-dimensional (3-D) models. Applications such as MicroStation® products, which are developed by Bentley Systems, Inc., Exton, Pa. U.S.A., and AutoCAD® products, which are developed by Autodesk, Inc., San Rafael, Calif., U.S.A., are typical of such CAD software, which may be used in the engineering, construction, and operations (ECO) marketplace.

In large design projects, for example, such as skyscrapers and large office complexes, hundreds of drawings and models for the electrical, HVAC, plumbing systems etc. are generated using CAD systems. Typically, these large design projects involve a variety of clients, vendors, and internal designers. The clients, vendors, and internal designers may use different CAD systems. For example the plumbing contractor may use AutoCAD and the design engineer may use MicroStation. The different CAD systems use different file formats, for example, MicroStation® files are in a DGN format whereas AutoCAD files are in a DWG format. These different file formats are not compatible with each other and must be converted into a format acceptable by the particular CAD system in order to share project data and so drawings may be viewed using the different systems. Thus, files created by the design engineer must be converted into an acceptable format so they can be viewed by the plumbing contractor and vice versa.

Consequently, there is a need to create DGN, DWG, and other project directories that contain all of the drawings required for a particular project. Moreover, it is desired to keep an up-to-date copy of the project data in both formats so it is easy to send files and to receive files from vendors, contractors, and internal designers at any point during a project.

The manual process of keeping track of which files have been converted and which files still need to be converted can be difficult and labor intensive for large projects. In the past, files were converted at the end of a project or at a milestone within the project. This leads to problems when information is required before conversion is carried out or when deadlines approach and all relevant files have not been converted. The rush to convert files may lead to errors or some files not being converted. Thus, there is a need to simplify and automate the conversion process for large projects by maintaining closely synchronized data files in different formats. Additionally there is a need to track which files have been converted and when.

SUMMARY OF THE INVENTION

The present invention provides systems and methods of maintaining data in a synchronized state by simplifying and automating the file conversion process in a continuous and mostly background manner. In one embodiment, the invention searches a specified source directory (and its subdirectories) for source files of a particular format. Any source files it encounters for the first time are converted into the desired format and stored at a specified destination, creating a destination file. A time and date stamp of the destination or converted file is stored in a database. For source files encountered for a second or subsequent time, the date and time stamps of all of these source files are compared against the database that contains file name, date and time information for converted or destination files. The present invention automatically converts any source files that are newer than its corresponding destination file.

In a preferred embodiment, the process runs through iterations to keep the data synchronized in a near real-time state. Since the number of files associated with a project could be quite numerous, with each iteration, only the source files that have changed since the last iteration will be operated on. In another embodiment, the invention will also check reference file dependencies. If the main source design file itself has not changed, but any attached reference files have, the destination file will be updated accordingly.

In another embodiment, the invention will also check dependencies with MicroStation BASIC import/export settings files. If the source design files have not changed, but the settings files have, the invention will update each destination file that it needs to.

DETAILED DESCRIPTION OF THE INVENTION

The present invention provides systems and methods of maintaining data in a synchronized state by simplifying and automating the file conversion process in a continuous and mostly background manner. In one embodiment, the invention searches a specified source directory (and its subdirectories) for source files of a specified first format. Any source files of the first format it encounters are translated into a second format and stored at a specified destination, creating a destination file.

The invention can also account for changes made to existing files. As above, the invention searches a specified source directory (and its subdirectories) for source files of a specified first format. Any source files of the first format it encounters for the first time are translated into a second format and stored at a specified destination, creating a destination file. A time and date stamp of the destination or converted file is stored in a database. For source files encountered for the second or subsequent time, the date and time stamps of all of these source files are compared against the database that contains file name, date and time information for converted or destination files. The present invention automatically converts any source files that are newer than its corresponding destination file.

In a preferred embodiment, the process runs through iterations to keep the data synchronized in a near real-time state. Since the number of files associated with a project could be quite numerous, with each iteration, only the source files that have changed since the last iteration will be operated on. Thus, after the initial conversion, the invention will require less system resources to keep the converted files updated. The process may then go into a waiting or hibernation mode for a pre-determined period of time before beginning the next iteration. In other embodiment, the invention will also check reference file dependencies. If the main source design file itself has not changed, but any attached reference files have, the destination file will be updated accordingly.

The present invention is particularly suited for use in the ECO industry. Consequently, it is preferably implemented, and will be describe below, in the context of the systems and file formats used in that industry. As described above, numerous CAD program are available and each may use different file formats. These different formats are usually indicated by a file extension. The file extension is that part of the file name that is typically to the right of the period (.) in a file name. The file extension is typically (but not always) three characters. File extensions of .DNG, .DWG, and .DXF all indicate commonly used CAD files in different format. Therefore, it is preferable the invention supports at least the combinations of synchronized conversions specified below.

DWG and DXF to DGN

DWG or DXF to DGN

DGN to DWG

DGN to DXF

Figure 1:
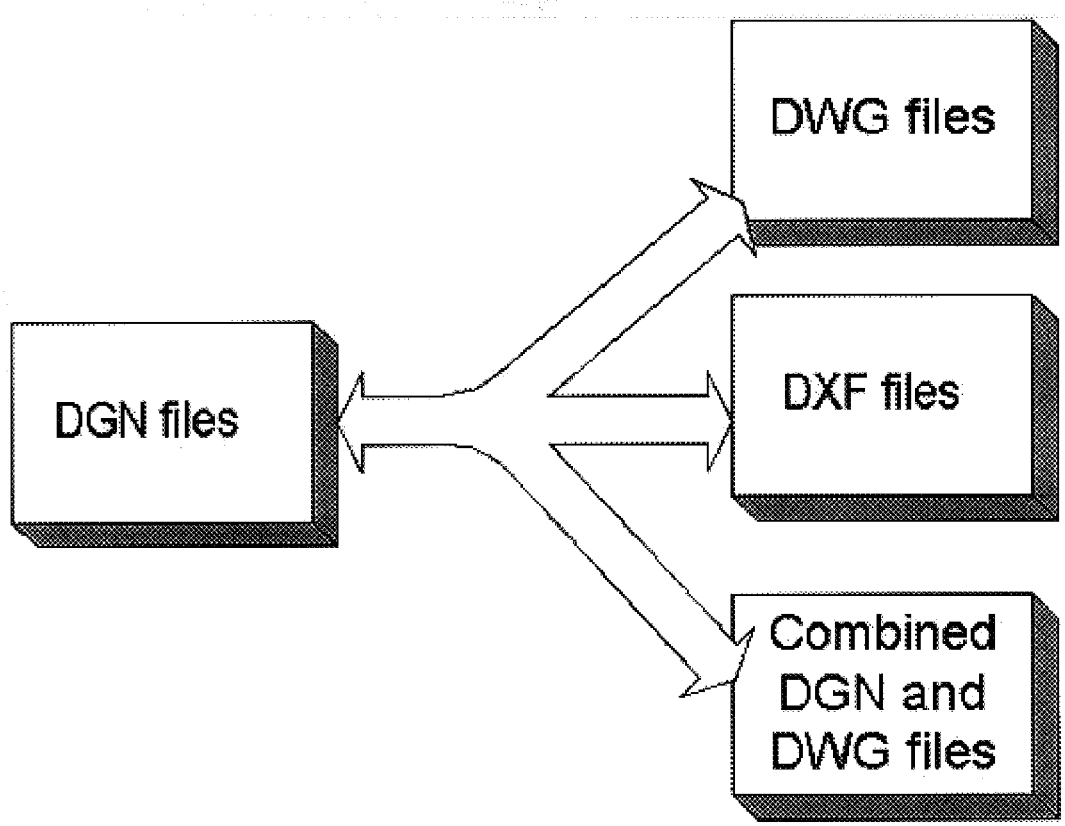
FIG. 1 illustrates the conversion capability according to an embodiment of the invention.

As shown in FIG. 1, the invention allows any DGN, DWG, or DXF file to be directly or indirectly converted into any other file format. Consequently, users of a particular CAD program will have access to project data created by a different CAD program In the ECO industry a client, vendor, or designer, hereinafter referred to as a user, typically has a workgroup file server that contains project directories. The user keeps their project data, including work in progress, in project-based directory hierarchies on the file server. These directory hierarchies may contain anywhere from a few hundred files to thousands of files. These file server directories are usually shared out to other computers on a LAN or WAN.

Figure 2:
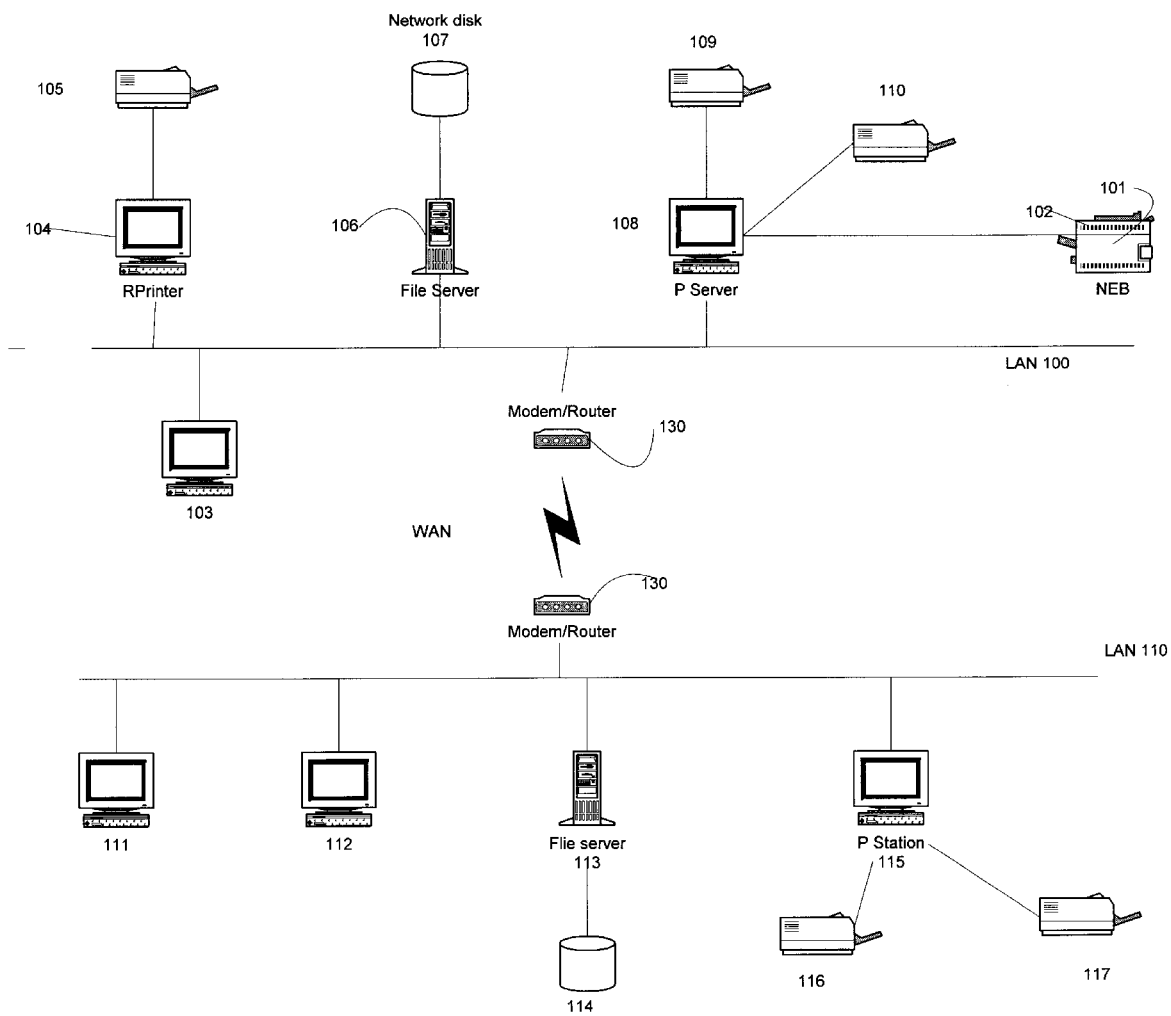
FIG. 2 is an illustration of typical a LAN and WAN.

FIG. 2 shows typical LAN and WAN architecture. FIG. 2 shows an interface board 101 which interfaces between a printer 102 and a local area network (LAN) 100 through a suitable LAN interface, for example, an Ethernet interface 10 Base-2 with coax connector or a 10 Base-T with RJ45 connector.

Plural workstations, such as workstations 103 and 104, are also connected to LAN 100, and under control of a suitable network operating system such as a Novell network operating system, those workstations are able to communicate with interface board 101. One of the workstations, such as workstation 103, may be designated for use as a network administrator. One or more workstations may also have a printer connected to it, such as printer 105 connected to workstation 104.

Also connected to LAN 100 is file server 106 which manages access to files stored on a large capacity (e.g., 10 gigabyte) network disk 107. A print server 108 provides print services to printers 109 and 110 connected to it, as well as to remote printers such as printer 105. Other unshown peripherals may also be connected to LAN 100.

Briefly, file server 106 acts as a file manager, which receives, stores, queues, caches, and transmits files of data between LAN members. For example, data files created respectively at workstations 103 and 104 may be routed to file server 106 which may order those data files and then transfer the ordered data files to printer 109 upon command from print server 108.

Workstations 103 and 104 may each comprise a standard IBM-PC or PC-compatible computer, capable of generating data files, transmitting such data files onto LAN 100, receiving files from LAN 100, and displaying and/or processing such files. Other computer equipment may also be incorporated into LAN 100, as appropriate to the network software being executed. For example, UNIX workstations may be included in the network when UNIX software is used, Apple MacIntosh computers may be included in the network when AppleTalk software is used, and all of those workstations may intercommunicate and communicate with interface board 101 under suitable circumstances.

Typically, a LAN such as LAN 100 services a fairly localized group of users such as a group of users on one floor or contiguous floors in a building. As users become more remote from one another, for example, in different buildings or different states, a wide area network (WAN) may be created which is essentially a collection of several LANs all connected by high speed digital lines, such as high speed integrated services digital network (ISDN) telephone lines. Thus, as shown in FIG. 2, LANs 100 and 110 are connected to form a WAN via modulator/demodulator (MODEM)/transponder 130. Each LAN includes its own workstations, and each ordinarily includes its own file server and print server, although that is not necessarily the case.

In operation, the users' computers mount the file server's shared directories. As the user creates and saves design files for a project, these files will be saved directly to that directory hierarchy on the file server. Although using the same network, the different workstations create files using different CAD programs. Therefore, the present invention is preferably implemented as computer software that will either run on the user's file server or on another machine that has access to the file server's directories. This will allow the invention to translate files created by different CAD programs or software and allow designers, no matter what CAD program or software they are using, to work on the same project or even the same drawing, etc.

Each user and workgroup has its own project file structure and conversion requirements, so flexibility is desired. The invention will preferably allow the user to specify:

how often they want the program to run from one iteration to the next where the source files are located and where the destination/destination files should exist Each instance of the process preferably carries out a one way conversion from one source file to one destination file (if the source file meets the criteria for conversion). Round trip conversions should not be performed simply because source and destination files can easily conflict and get overwritten.

As mentioned above, the invention includes computer software. The software may be downloaded from a website via the internet. Within the dataset downloaded is the code, setting files and license agreement for use of the program. The program may operate as a stand-alone application and can be run on either a Windows NT computer or a Windows NT Server. Alternatively, the program may be dependent on a server process that runs on a host server. This server process may pass licensing information to the program, and may also receive reporting information from the program.

It is not essential the user install the program or that it run on the user's server. Processing may also be performed off-site of the user's location. Data files may be submitted and retrieved via an application server than can be accessed by the user via the internet. The program can run on this application server and the project data can be stored on database servers, for example as an Internet-based ASP. Such an arrangement is described in co-pending U.S. application Ser. No. 09/586,784 now pending, entitled "System and Method of Providing Engineering, Construction, and Operations Computer-Aided Design Services", which is incorporated herein by reference.

Although other means of installing and running the program may also be used, the invention will be described as being installed by downloading from a website. The installation procedure is straightforward using InstallSheild and following on-screen prompts.

To install the software, the user must first download the program module from a specified location. The code should be placed in c:\temp. The user then double-clicks setup to begin the installation process. The first screen to appear is the Welcome screen. The user clicks OK to continue. The installation next checks the system configuration. The user clicks next to continue. A screen appears informing the user of license requirements. These requirements should be reviewed by the user, who then clicks Accept to agree to the licensing and proceed. Next, a destination for the program may be chosen or a default location used. An optional utility for displaying solids is provided. If solids are not required, the solid modeling utilities, which may be of a type widely used in the CAD/CAM industry, does not need to be loaded. Without this optional code, all solids are dropped to wireframe primitives or the solids may be ignored as an option by specifying this in the basic program. Clicking on Next continues with the installation and clicking on Finish completes the installation.

During the installation process a dependency database is generated and maintained by the program module on an output tree. This file should not be deleted because the program module will have to regenerate it the next time it is run. The code checks to see if this file has been created, and if it is not there, every file will be translated again, repeating work already performed and wasting system resources.

Figure 3:
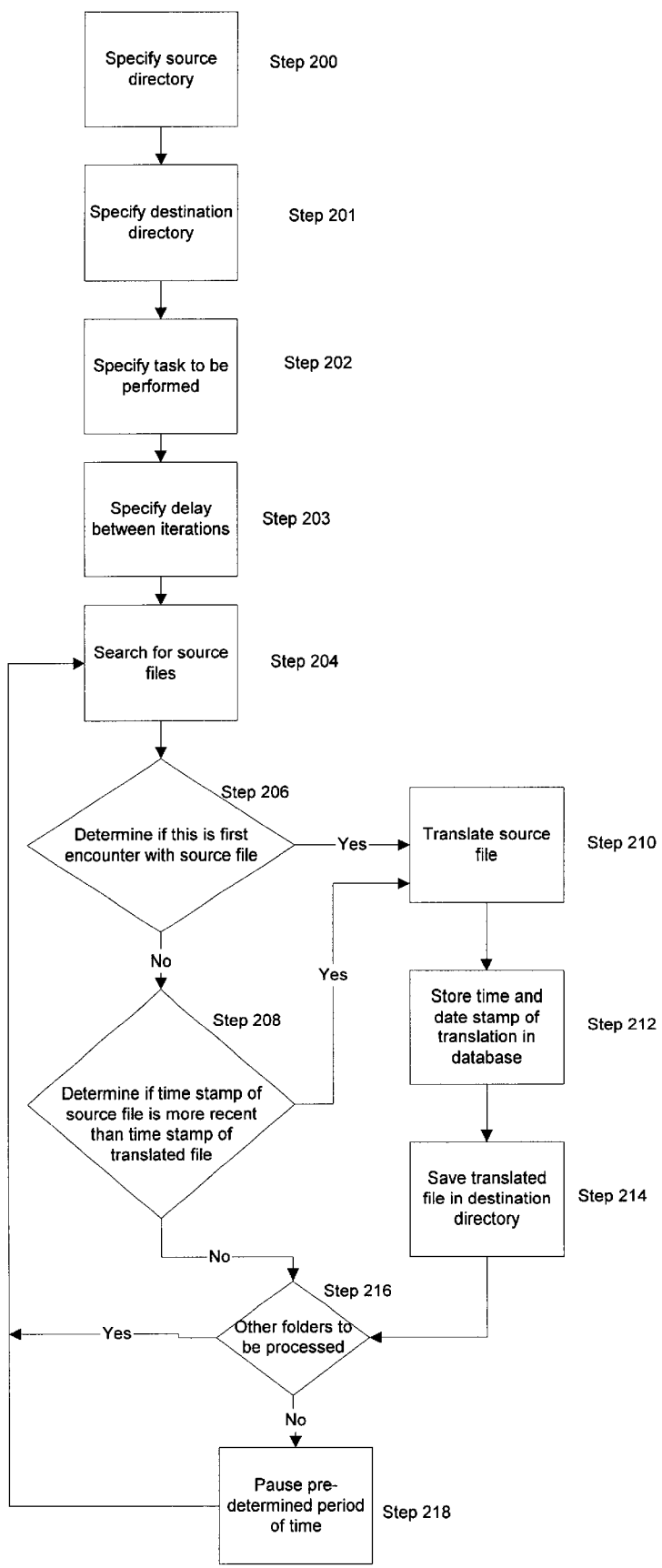
FIG. 3 is a flow diagram illustrating a process according to an embodiment of the invention.

Referring now to FIG. 3, a process according to an embodiment of the present invention will be described. This description assumes a software program has been installed on the user's computer, although, as mentioned above, processing may be performed by an application server. A more detailed description of the running of the program, its functions and commands is given below. After starting the program, the user specifies a location where the translation and conversion processing is to be performed, per step 200. This is done by specifying a directory or set of directories where source files to be converted are located. More than one source directory may be specified. The source directory is where the program will scan for data to convert. The source files may be located anywhere where the computer that is doing the processing has a drive connection or on any other storage device used for storing data that is accessible by the computer. This includes, for example, anywhere the computer has normal drive access including a hard drive, over a network, such as a LAN or other network, or via the internet. For example, in the WAN shown in FIG. 2, a process running on file server 106 can access and convert files stored on file server 113.

Step 201 allows the user to specify a destination directory that will be the root folder where the converted or destination files will be placed. The user can preferably only specify one destination directory. Similar to the source directory, the destination directory may be located anywhere where the computer that is doing the processing has a drive connection. The source directory and destination directory may be different from each other. Referring to FIG. 2, for example, the source directory may be on network disk 107 and the destination directory on disk 114. This feature of the invention allows the user to access source files at one location, convert them, and store the converted files to a different location. Accordingly, users of different software programs can have access to project data, no matter what software program was used to create the project data.

As shown in step 202, the user can also specify what function, for example, converting DWG files to DGN files, is to be carried out. How this is accomplished and a detailed description of the various functions is described below in relation to the software program. The user can also specify the amount of time the process pauses between iterations, step 203. This is the amount of time that elapses after one iteration completes and the next iteration starts. A time of 0 means iterations will run one right after the other continuously. The user may also schedule exactly what time the program will get executed.

For illustrative purposes, assume a first user uses MicroStation and a second user uses AutoCAD. At the start of the design project, the first user request all DWG files in a specified folder, that folder used by the second user, be to be converted to DGN format and then output to a particular destination drive. This allows the first user to work with project data generated by the second user. After making the request, the first user does not need to do anything else. The process according to the invention will automatically translate any files created by the second user into DGN format and as new DWG files are created or old files are modified, the process will translate and update the DGN files accordingly. The first or second user can also request the DGN files be translated into DWG format, so the second user will have access to any changes made by the first user.

In response to the request, the process takes a path through the folder or multiple folders specified in step 202 and the source directories are searched for the desired files, per step 204. In step 204, the process preferably searches and collects source files that need to be converted and then stops the search until all files get translated. Thus, the present invention allows a batch of files to be processed at one time.

In this example, as DWG files are encountered during the search, the program determines, in accordance with step 206, if this is the first time a particular source file has been encountered. Searching a database for translated or destination files corresponding to the source file may do this, for example. Also, a log file, described in more detail below, may be created during processing of the source files. The log file contains a listing of all files that have been translated. The log file may be examined to determine if a source file has already been translated. If no corresponding destination files are found or the log file does not contain an entry for the source file, this is the first encounter with a particular source file and the process proceeds to step 210. In that step, the source file is translated from a DWG file to a DGN file. All the information in that source file is digested and is output in a respective destination file in the specified format. The process also places information about the translated file into a database, as shown in step 212. The information stored in the database includes a source file name, date and time of the conversion. In step 214, the translated files are then saved as destination files in the destination directory specified in step 201 and the process moves to step 216.

If this is the second or subsequent time the process encounters a particular source file, the process proceeds from step 206 to step 208. When such source files are encountered, the time and date stamps of all these files are compared against the file names and time and date stamps stored in the database. This detects if any changes have been made to the source file. If any source files that are a newer version than the corresponding destination files are detected, the process move to step 210 and automatically converts those files. The process then proceeds from that point as described above, replacing the previous time and date stamp in the database with the time and date stamp of the new conversion and saving the updated destination file in the destination directory in place of the previous destination file. Since the number of files associated with a project could be quite numerous, with each iteration, it is preferable that only the source files that have changed since the last iteration will be operated on. Therefore if the source file is not more recent than the corresponding destination file, the process proceeds to step 216. At this point, the branches of the process merge back together.

According to step 216, the method moves on to process another specified folder, returning to step 204 and proceeding from there. If no other folders are specified, the process goes on to step 218. At this time, the process pauses the amount of time specified in step 203, a kind of "hibernation" mode. After the specified time has elapsed, the process returns to step 204 and another iteration is begun.

Thus, the present invention cycles through iterations that are separated by a user selected delay. During each iteration, new source files are automatically translated and translations of source files which have be modified are automatically updated. Using an iterative process, the present invention maintains a near real-time synchronization of the files in different formats.

Accordingly, the present invention manages the process of keeping the source files for a given project in one format synchronized with an equivalent set of destination files in another format. In the example given above, the DWG files in the source directory will be mirrored with an equivalent set of DGN files in the destination directory. At any time, and without any manual intervention, anyone with access, either through the LAN, internet, etc., can view or make a copy of a source or destination file for any drawing in the project. The present invention utilizes an iterative type scenario and operates continuously as long as the user specifies or as long as the program is running. Whenever new source files are added to the project and saved in the source directory, the present invention can convert them into the specified format and save them to the specified destination. Moreover, the program can run continuously as a background process.

In a further embodiment of the invention, reference file dependencies are also checked. Reference files are files that depend upon a main file, but are not a part of the main file. If the main source file itself has not changed, but any attached reference files have, the destination file will be updated accordingly. To do this, a database, mentioned above, is created the first time a tree of source files gets translated. The database file is preferably located in the root destination directory and contains file date and time information for each source file and conversion settings file. The process will check the date and time stamp of a source file and its dependencies against the database for each iteration. If the file information in the database differs from the source file and its dependencies, that indicates that either the source file or the files it is dependent on have changed. When this is true, the source file or one of its dependent reference files (or both) will be translated and the database will be updated. The process of checking the time and date stamp, conversion, and updating the database is similar to that described above and will not be repeated here.

Referring to the table below, a more detailed description of a software program according to an embodiment of the invention and the different functions it may perform will now be given. The program runs in a continuous manner and is preferably executed primarily as a background task and may be started as an NT service. Once set up, this process can run unattended.

The program runs from a DOS prompt, or as an NT service where the user can set up "watched" directories for automatic translations or do single or batched conversions. The invention also further helps synchronization by tracking files that have already been translated in the log file. The log file also helps speed batch conversions, since files with the same time stamp as the logfile record are not updated.

In order to load the program, the user must first Open a DOS shell by selecting Start>Programs>Command Prompt or double-click on the module icon to open the DOS shell. At the DOS prompt, type the program name. The following usage key appears:

| Switch | Function |
|---|---|
| — | Required parameter. |
| x<dwgin\|dwgout\|dxfo ut [,file] | Uses dwgin to convert dwg or dxf files to dgn<br>Uses dwgout to convert dgn files to dwg<br>Uses dxfout to convert dgn files to dxf<br>Uses an optional file that contains source file names associated with DWG BASIC files |
| -f<e:exts\|w\|x> | Uses a filter to exclude files from batch conversion based on the extension name<br>• w excludes DWG files<br>• x excludes DXF files<br>• Use pipes <\|> to add more options<br>• Use commas <,> to add more extensions |
| -d<m\|r\|b> | Dependency for re-translation.<br>• m-master file<br>• r-reference file (DGN only)<br>• b-MicroStation BASIC file. No dependency (-d alone) always re-translates files. Default: check all. |
| -i<mins> | Sets the time between automated batch processes |
| -l | Lists files that qualify for translation, but does not translate them |
| -m<filename> | Redirects all messages to a message log file |
| -p | Required Parameter. Assigns a project name |
| -r | Retains the complete root path of the source in the destination |
| -s | Processes subdirectories |
| -u | Updates only if the file or subdirectory exists in the destination |
| -U | Updates only subdirectories |
| @<file> | Reads interchange commands from file |

The required set of parameters in any command sequence or script are: (a) -x(dwgout\|etc; (b) -p—for the project specification; and (c) one directory (to specify the location of the watched directory). When this stream is input, the result is placed in the specified directory name/out directory.

A project name should appear in the command stream. This name is assigned and obtained during the project registration process. The following examples are two possible command streams and their results.

Example 1) To specify multiple watched directories:
Key in: interchange -xdwgout -pmyproject c:\project1 c:\project2\*.dgn c:\dwgs This converts all design files in c:\project1 and all the design files with extension .DGN in c:\project2 to DWG files and places them in the target directory c:\dwgs. The target directory can be omitted by using the asterisk '*'. The resulting files will then be exported to the same root directory as the source.

Example 2) To export files with the directory specified by an *
Key in: interchange -xdwgout -s -pmyproject c:\project1 \\neptune.mycompany\project2 *

This command converts all DGN files and subdirectories in c:\project1 to DWG files in c:\project1\out and the DGN files in \neptune.mycompany\project2 to \\neptune.mycompany\project2\out.

In a command stream, the last directory name is always the destination tree. However, a wildcard character (for example, the asterisk *) can be used as a floating directory for the destination. A floating directory is a sub-directory appended at the end of each source directory as a destination directory for that source directory. The wildcard character still must be the last directory name specified on command line. If a name is followed by the wildcard character, it will be used as the name of the sub-directory. If no name is followed by the wildcard character, a default name, for example, "out" will be used.

The following are some examples to illustrate the usage:
Example 3) interchange -xdwgout -pmyproject e:\project1 \\neptune\project2 * -pIDabc will put translated DWG files on e:\project1\out\ and \\neptune\project2\out\ respectively.

Example 4) interchange -xdwgout -pmyproject e:\project1 \\neptune\project2 *dwg -pIDabc will put translated DWG files on e:\project1\dwg\ and \\neptune\project2\dwg\ respectively.

If the sub-directory name contains a space character, make sure to quote it, for example:
interchange -xdwgout -pmyproject e:\project1 \\neptune\project2 *"output dwg files" -pIDabc will put translated DWG files on e:\project1\output dwgfiles\ and \\neptune\project2\output dwgfiles\ respectively.

The watched directory is specified in the command line. The watched directory(ies) is the first path keyed in after the command interchange. One instance of interchange can watch multiple directories by keying in additional paths as shown in the earlier example 1). The final path in the command line is the location to which the translated data will be stored.

In addition to the functions and commands described above, the program may also perform the following functions:

Search for changed files but don't convert—This is used mainly for information purposes. The user can specify that they want to list which files have changed to a log file or to the screen. This action will not convert the files listed.

Handle reference file dependencies—The program can automatically keep track of reference file dependencies and convert the source file if the files that it is dependent on have changed, as described above.

EXAMPLE 1

Interchange -xdwgin j:\project1 j:\project2 k:\outputdgns\ will generate the database file k:\outputdgns\Interchange.db to track changes made in the DWG files and their associated MicroStation BASIC files, for both project1 and project2.

EXAMPLE 2

Interchange -xdwgout -s c:\dgnfiles\ *
will generate c:\dgnfiles\out\Interchange.db to track the source files in c:\dgnfiles and all of the subdirectories, associated MicroStation BASIC files, and reference files. Thus if the user chooses to merge reference files for conversions, any change made in a reference file can be stored into and retrieved from the database.

Filter by source file type—The user can specify that source files with certain file extensions are not processed. Using file extensions, a user can specify which files in the source directory are unwanted files that they want to filter out or ignore. For example, in order to convert only DWG files from a source directory that contains both DWG and DXF files, the user can specify to filter out the .dxf file extension.

Specify command file—The user can specify all options and arguments in a command file, and specify that command file by using the @filename argument. This is very useful when a large amount of files are to be processed. This file should preferably be in XML-format, be accessible from the project folder on an application server, if used, and be automatically used if the program is installed as an NT Service. An example of a command file is given below.

Specify MicroStation BASIC files to control the conversion—The user can point the program to a list that maps a source directory to a MicroStation BASIC file that they want to control the conversion for that particular source directory. This list can contain a number of source directory to MicroStation BASIC file mappings. With this list the user can specify a separate conversion configuration for each subdirectory in their source directory hierarchy. This file should be accessible from the project folder on the application server, if used, and be set up by the project administrator.

Limit files converted based on the destination directory hierarchy—The user can specify a -u (update) option that will only convert files that have a matching file in the destination directory structure.

Purge files from destination (output) tree—If the user doesn't want files to be translated anymore, they can remove the translated files from the destination directory hierarchy. Then they can use the -u option mentioned above under Limit which files are converted.

Pre-check all files—The user can specify that the program go through the source files and determine whether they will be converted or not without actually converting them. This option (-l) can tell the user if there are any source files that are out of synch according to the source file dependency database.

Save directory searching messages to log file—The user can specify all messages from its directory search and file comparison step are directed to a log file. The user defines the path and file name for that log file.

Save conversion messages to a log file—Some conversion information is automatically recorded in a log file. The location of the file is under folder\Bentley\Logs\. The name of the file is Interchange.file.log for the first instance and a process ID appended in this name for more instances. The file records conversion log for one iteration, i.e. it keeps the most recent conversion iteration, for example:

\Bentley\Logs\interchange.files.log→first instance
\Bentley\Logs\interchange.files67.log→another instance with process ID 67
\Bentley\Logs\interchange.files204.log→another instance with process ID 204

During the course of running the service, the status can be checked using command blogdump which dumps history of the interchange service to the DOS shell. The log data is stored in \Bentley\Logs\trace.log which grows and wraps around when the default log size limit is reached. If the log file is deleted, a new one will be created when the service is started again.

In the embodiment described above, an installed service does provide interactive user access to users. However, a manual intervention option may also be provided and is described below.

An access hook can be performed manually. The access hook requires a specified command file, \Bentley\Program\interchange\temp\!msint.cmd.macro! This file should include all commands, source directories and destinations. A text editor may be used to create a command file. The program server constantly waits for this file. It does not act until this file is present and valid. If the user happened to created an invalid file, interchange will rename it to #iccmd.save# and enter the wait state again until a new file is present. If the file is valid, the program will put it into action and begin to search files to synchronize source and targets. At the end of each run, the program will preferably always check for the file and update the input if necessary.

When multiple source files and command line parameters are used, a command file, mentioned above, is strongly recommended. A command file is called with the following string:

interchange @mycommands.list
where mycommands.list may appear as:
List of all commands, source and/or destination files/paths. It is
a convenient way for processing multiple files at a time.
For example, add DGN files/paths into a variable, say dgnFiles:

dgnFiles=c:/dgns/project1 \
c:/dgns/project2 \
c:/dgns/project3 \
c:/dwgs/allProjects
and put it into command line:
-s -xdwgout $(dgnFiles)
Use an asterisk character * at the end of the file list to avoid
explicit destination. Thus all files are to be exported to the same
source paths under a sub-directory \out.
%if import=1
### do import
%else # do export
fileList=k:/project1 \
"c:/a path with spaces must use quotes/project2" \
//mars.abc.com/project3 \
*
transOptions=-xdwgout -s
$(fileList) $(transOptions)
%endif The program module can perform conversions between different formats in two different directions, that is, for example from a file in a first format to a second format and from a file in the second format to the first format, at the same time. To run dwgin and dwgout from the same command file the execution command needs to be separated according to an environment variable. An NT environment variable may be set in a window (only in desired window) like this:

set abc_dwg2dgn=1

This variable can also be set in the batch file with which that you start your import window each time. Do not set it as a system environment variable via System Properties dialog box on NT. After the above environment variable for the desired window is set, the command file may be written to look like this:

. . .
add your folder list
FolderList=folder1 \
folder 2 \
. . .
%if defined $(abc_dwg2dgn)
action=-xdwgin,g:\Bentley\Home\msint\303-MID-primary-assoc.list
%else
action=-xdwgout,g:\Bentley\Home\msint\303-MID-primary-assoc.list
%endif
now take the action according to environment variable set forth:
$(FolderList) $(action) -p,303-MID-Current.pcf
end The command file shown above can thus be used for two-way conversion, but it should be ensured sure the window in which interchange is running has the correct environment variable set.

Two or more instances of the program module can be running simultaneously. However, there are a few details that will ensure reliable operation of the code. Avoid using the same destination for two instances of the program. If a translated file is to be written to the same output file, there may be unexpected results. Avoid a round-trip processing. For example, the following chain is not recommended. The source files of instance 1 become the destination files of instance 2 and the destination files of instance 1 become source files for instance 2. Such a circulation can cause unexpected results. Be sure to clean up the \Bentley\Logs\ directory prior to running multiple instances so there is no confusion with logs generated from last time interchange was run. When it is desired to use multiple project configuration files in multiple instances environment, the NT environment variables for windows can be used, as above. For example each window can have its own _USTN_ PROJECTNAME set to activate different project configuration files.

The following discusses modifications of the file "dwgcontrol.bas" used to store and control translation settings. Most of the parameters used in the conversion process are stored in the \home\msint directory. The primary file used to manipulate the parameters is DWGCONTROL.BAS.

In addition to the control program dwgcontrol.bas, there are a number of *.tbl files that can be set to provide specific data mappings. All files are bi-directional mapping tables with the exception of dwghatch. The files provided may include:

| File | Usage |
| --- | --- |
| dwgchar.tbl | Character mapping |
| dwgcolor.tbl | Color mapping |
| dwgfont.tbl | Font mapping |
| dwghatch.tbl | Hatch mapping |
| dwglevel.tbllevel mapping | Layer-level mapping table. |
| dwgline.tbl | Line type-line style mapping table |
| dwgwtco.tbl | Line weight-color mapping |
| dwgwtwt1 | Line weight-line weight mapping for AutoCAD 2000. See See AutoCAD 2000 Line Weight Mapping. |
| dwgwtwt2 | Another file for line weight-line weight mapping for AutoCAD 2000. See AutoCAD 2000 Line Weight Mapping. |
| shxfont.tbl | Maps MicroStation fonts to Shape File (shx) fonts. |
| ttfont.tbl | TrueType font mapping |

A copy of an attached image file may be made on conversion. By default, if a raster attachment in a DGN file is an AutoCAD supported format, the resultant DWG image attachment will reference the same raster file without copying it. If the raster format is not supported by AutoCAD but can be converted to TIFF file, which is a supported format in AutoCAD, the raster file will be converted to a TIFF file with the same root name, on the same path but with a .tif extension name. There is an option to copy attached raster file to a user destination. For example:

MbeDWGExportSettings.copyRasterFileTo= "c:\\delivery\\imagefiles\\" will make a copy of attached raster file to folder c:\\delivery\\imagefiles\\. If a raster format is not supported in AutoCAD, a converted TIFF file, instead of original file, will be copied to this folder. Consequently the resultant image attachments in DWG file will reference those in the new folder, instead of those in original folder. If an asterisk character * is used for file location, raster files will be copied to the directory to where the DWG is exported.

An AutoCAD UCS can be created from a MicroStation rotated view. A rotated view in MicroStation may have an arbitrary orientation. This does not hold true in AutoCAD where the cursor and UCS icon are always aligned with the view. While this is acceptable for storing data, views may not appear as desired. If an oriented look is desired, however, the following option can be switched on such that a UCS will be created to orient the view in AutoCAD. Because in a UCS coordinates readouts may be different than they were in MicroStation this option is not recommended for general purposes. The command is:

MbeDWGExportSettings.convertRotatedViewToUcs= MBE_On where MBE_on will convert rotated view to UCS and MBE_Off will not.

When exporting text, special symbols such as „Ø, or any other ASCII value that is greater than 127 can be (or not) converted to AutoCAD special codes prefixed with %%. The following setting can be used to for such purpose:

MbeDWGExportSettings.convertSpecialCharacters= MBE_On will make the translator convert all special symbols, except for those in multibyte languages, to AutoCAD codes. This setting will produce the effect that the characters look the same. However, each of these characters is prefixed with %%. Sometimes this is not desirable, particularly if a font is mapped to a shape file that supports special symbols in AutoCAD as they do in MicroStation. In that case, consider using MBE_Off to not convert these characters.

The following strings are used in AutoCAD 2000 Line Weight Mapping:

MbeWeightWeightTable.addImportEntry AcadLineWeight, MsLineWeight

MbeWeightWeightTable.addExportEntry AcadLineWeight, MsLineWeight

MbeWeightWeightTable.addImportExportEntry AcadLineWeight, MsLineWeight

MbeWeightWeightTable.addImportEntryFromFile TableFileName[, EnvVar]

MbeWeightWeightTable.addExportEntryFromFile TableFileName[, EnvVar]

MbeWeightWeightTable.addImportExportEntryFromFIle TableFileName[, EnvVar]

Where: AcadLine Weight is the line weight index in AutoCAD

MsLineWeight is the line weight index in MicroStation

TableFileName is the name of the table file that maps the weights. The text file can be created and modified using any text editor, such as MicroStation Basic Editor, notepad, MicroSoft Word (as an ASCII text file), etc. The first column is AutoCAD line weight and the second is MicroStation line weight.

The following immediately following example will convert AutoCAD lineweight 30 (0.3 mm or 0.012") to MicroStation weight number 2. Entities with weights BYLAYER/BYBLOCK will convert to the weights according to the layers or blocks they belong to. Those with weight DEFAULT will be forced to be weight number 3.

EXAMPLES

MbeWeightWeightTable.addImportEntry 30, 2

MbeWeightWeightTable.addImportEntry MBE_WEIGHT_ByLayer, −1 will use the line weight of the layer an entity is on and map that line weight index to MicroStation line weight MbeWeightWeightTable.addImportEntry MBE_WEIGHT_ByBlock, −1 will use the line weight of the block an entity belongs to and map that line weight index to MicroStation line weight Example MbeWeightWeightTable.addImportEntry MBE_WEIGHT_Default, 3 will map AutoCAD line weight DEFAULT to line weight 3

Like color and linetype, AutoCAD 2000 line weight has BYLAYER and BYBLOCK.

The behavior in line weight is the same as they are in color and linetype. Map BYLAYER/BYBLOCK to −1 to obtain the line weight value of the layer/block. If BYLAYER/BYBLOCK is mapped to a valid MicroStation line weight index, any entity with BYLAYER/BLOCK will be forced to use that line weight value, instead of the value of the layer/block. Another special value is DEFAULT which is present in line weight. Similar to BYLAYER/BYBLOCK, DEAFAULT may be mapped to −1 to get default value of an entity. Any other value will force DEFAULT to be set to that specific value.

While the invention has been described in terms of a preferred embodiment in a specific system environment, those skilled in the art recognize that the invention can be practiced, with modification, in other and different hardware and software environments within the spirit and scope of the appended claims. For example, the user interaction described above is via data entry with a keyboard, however, a more graphical interaction, such as that common to Windows® based programs, may also be used.

I claim:

1. A method for synchronizing data files of different formats, comprising:
   a) receiving a specified location including a plurality of directories or subdirectories, a specified first format, and a specified second format, that is different from the specified first format;
   b) searching the specified directories or subdirectories during a single iteration for any source files of the specified first format;
   c) determining if the source files found by the search has been previously converted into the specified second format and if so proceeding to step h), other wise proceed to step d);
   d) converting only the found the source files into the specified second format;
   e) storing the converted file at a second specified location;
   f) storing a time and date stamp of the converted file in a database;
   g) proceed to step k);
   h) comparing the time and date stamp of the converted file with a time and date stamp of the corresponding source file;
   i) updating the converted file when the time and date stamp of the corresponding source file is more recent than the time and date stamp of the converted file;
   j) storing the time and date stamp of the updated converted file in the database; and
   k) returning to step a).

2. The method of claim 1 further comprising waiting a predetermined period of time before performing step j).

3. The method of claim 2 wherein a user interacts with the program to specify the pre-determined period of time.

4. The method of claim 1 wherein the conversion is performed with a translation program stored on a computer.

5. The method of claim 1 wherein the computer is connected to a network.

6. The method of claim 1 wherein a user interacts with the program to specify the source files to be converted.

7. The method of claim 1 wherein a user interacts with the program to specify a destination for storing the converted files.

8. The method of claim 1 further comprising creating a log file of all source files that have converted.

9. The method of claim 8 wherein step b) comprises examining the log file for a listing corresponding to the source file.

10. The method according to claim 1, wherein the first format is input via a user interface.

11. A computer useable information storage medium storing computer readable program code for causing a computer to perform the steps of:
    a) receiving a specified location including a plurality of directories or subdirectories, a specified first format, and a specified second format, that is different from the specified first format;
    b) searching the specified directories or subdirectories during a single iteration for any source files of the specified first format;
    c) determining if the source files has been previously converted into the specified second format and if so proceeding to step h), otherwise proceeding to step c);
    d) converting only the found the source files into the specified second format;
    e) storing the converted file at a second specified location;
    f) storing a time and date stamp of the converted file in a database;
    g) proceeding to step k);
    h) comparing the time and date stamp of the converted file with a time and date stamp of the corresponding source file;
    i) updating the converted file when the time and date stamp of the corresponding source file is more recent than the time and date stamp of the converted file;
    j) storing the time and date stamp of the updated converted file in the database; and
    k) returning to step a).

12. The computer useable information storage medium of claim 11 further comprising computer readable program code for causing a computer to perform the step of waiting a predetermined period of time before performing step k).

13. The computer useable information storage medium of claim 12 wherein a user interacts with the program to specify the pre-determined period of time.

14. The computer useable information storage medium of claim 11 wherein the conversion is performed with a translation program stored on a computer.

15. The computer useable information storage medium of claim 11 wherein the computer is connected to a network .

16. The computer useable information storage medium of claim 11 wherein a user interacts with the program to specify the source files to be converted.

17. The computer useable information storage medium of claim 11 wherein a user interacts with the program to specify a destination for storing the converted files.

18. The computer useable information storage medium of claim 11 further comprising computer readable program code for causing a computer to perform the step of creating a log file of all source files that have converted.

19. The computer useable information storage medium of claim 18 wherein step b) comprises examining the log file for a listing corresponding to the source file.

20. A method of synchronizing files, comprising:
    providing a database for storing a plurality of source files, the source files including reference files and main files wherein reference files depend on main files;
    providing a second database for storing a plurality of destination files that correspond to the source files, wherein the destination files include reference files and main files having the same dependencies as the source files; and
    updating the destination files if it is a reference file and its corresponding main file has been modified, even if the source file corresponding to the destination file has not been modified.

21. The method according to claim 20 further comprising translating the source files from a first format into the destination files of a second format that is different from the first format.

22. The method according to claim 21 further comprising creating a log file of all source files that have been translated.

23. The method according to claim 21 further comprising creating a database containing a time stamp of the destination files.

24. The method according to claim 23 further comprising updating the destination file if a time stamp of the source file is more recent than the time stamp in the database for the corresponding destination file.

25. A method of synchronizing files of different formats, comprising:
- a) providing files of a first format stored on a storage medium;
- b) specifying files of the first format to be converted into a second format;
- c) referencing a mapping table that specifies changes to be made to graphic symbology of the files of the first format;
- d) converting the specified files into the second format based in part on the mapping table and storing the converted file at a specific location in the storage medium;
- e) storing a time and date of the conversion in a database;
- f) comparing the time and date of the conversion with a time a date stamp of the specified file;
- g) updating the converted file when the time and date stamp of the specified file is more recent than the time and date stamp of a corresponding converted file; and
- h) repeating steps c)–g).

* * * * *

UNITED STATES PATENT AND TRADEMARK OFFICE
CERTIFICATE OF CORRECTION

PATENT NO. : 6,671,701 B1  Page 1 of 1
DATED : March 4, 2004
INVENTOR(S) : Phil Chouinard, Don Fu and Keith Bentley It is certified that error appears in the above-identified patent and that said Letters Patent is hereby corrected as shown below:

<u>Title page,</u>
Item [75], Inventors, insert the following:
-- Don Fu, 111 Stetson Dr., PA (US)
   Keith Bentley, 100 Morningside Dr., Elverson, PA (US) --

Signed and Sealed this

Twenty-seventh Day of April, 2004

JON W. DUDAS
*Acting Director of the United States Patent and Trademark Office*